United States Patent
Jonassen

(10) Patent No.: US 8,491,727 B2
(45) Date of Patent: Jul. 23, 2013

(54) APPARATUS DEVICE FOR REMOVING SCALE IN A BOREHOLE INSTALLATION

(75) Inventors: Jarle Jonassen, Sandnes (NO); Ann Jeanett Jonassen Ellingsen, legal representative, Figgjo (NO)

(73) Assignee: Exai AS, Bergen (NO)

( * ) Notice: Subject to any disclaimer, the term of this patent is extended or adjusted under 35 U.S.C. 154(b) by 280 days.

(21) Appl. No.: 12/921,737

(22) PCT Filed: Mar. 6, 2009

(86) PCT No.: PCT/NO2009/000077
§ 371 (c)(1),
(2), (4) Date: Oct. 19, 2010

(87) PCT Pub. No.: WO2009/113863
PCT Pub. Date: Sep. 17, 2009

(65) Prior Publication Data
US 2011/0240058 A1 Oct. 6, 2011

(30) Foreign Application Priority Data
Mar. 11, 2008 (NO) .................................. 20081279

(51) Int. Cl.
*B08B 1/00* (2006.01)
*B08B 9/04* (2006.01)

(52) U.S. Cl.
USPC ........... 134/166 C; 134/8; 166/170; 166/173; 15/104.069; 15/104.15

(58) Field of Classification Search
CPC .. B08B 9/02; B08B 9/04; B08B 9/0436; B08B 9/043; F23J 3/026

USPC ............ 134/8, 166 C, 167 C; 166/170–176, 166/298

See application file for complete search history.

(56) References Cited

U.S. PATENT DOCUMENTS

| 2,579,813 | A | * | 12/1951 | Frank | 15/104.061 |
| 2,641,010 | A | * | 6/1953 | Lang et al. | 15/104.15 |
| 2,664,930 | A |   | 1/1954 | Leonard | |
| 2,667,930 | A |   | 2/1954 | Saurenman et al. | |
| 2,836,251 | A |   | 5/1958 | Claypool | |
| 3,176,772 | A |   | 4/1965 | MacGregor | |
| 3,262,143 | A | * | 7/1966 | Reinhart | 15/104.061 |
| 3,525,111 | A | * | 8/1970 | Von Arx | 15/104.061 |
| 4,085,477 | A | * | 4/1978 | Anderson | 15/104.069 |

(Continued)

FOREIGN PATENT DOCUMENTS

| DE | 400552 | | 8/1924 |
| DE | 832090 | | 11/1952 |
| EP | 0516989 | A1 | 12/1992 |

*Primary Examiner* — Michael Kornakov
*Assistant Examiner* — Marc Lorenzi
(74) *Attorney, Agent, or Firm* — GableGotwals

(57) ABSTRACT

There is described an apparatus device for mechanically loosening scale inside a pipe arranged to convey hydrocarbon fluids from a production zone in a well, in which an actuator arranged in a housing includes an axially movable stem which extends through at least part of the housing and is provided with at least one cam, at least one cutting means is arranged radially movable in a recess in the housing, the cam bearing, by the axial movement of the actuator towards a first extreme position, against the cutting means, applying to it a push force directed radially outwards. There is also described a method of mechanically loosening scale inside a pipe arranged to convey hydrocarbon fluids from a production zone by using the apparatus.

9 Claims, 5 Drawing Sheets

U.S. PATENT DOCUMENTS

| | | | | |
|---|---|---|---|---|
| 4,415,029 A * | 11/1983 | Pratt et al. | | 166/212 |
| 4,452,307 A | 6/1984 | Horton | | |
| 4,573,231 A | 3/1986 | Stocksiefen et al. | | |
| 4,920,600 A | 5/1990 | Reinhart | | |
| 5,096,262 A * | 3/1992 | Foullois | | 299/55 |
| 5,361,286 A * | 11/1994 | Monserud et al. | | 376/316 |
| 5,474,097 A | 12/1995 | Lowe et al. | | |
| 5,553,668 A * | 9/1996 | Council et al. | | 166/77.3 |
| 6,070,285 A * | 6/2000 | Geppert | | 15/104.061 |
| 2002/0023781 A1* | 2/2002 | Peters | | 175/67 |
| 2003/0024702 A1* | 2/2003 | Gray et al. | | 166/301 |
| 2004/0194809 A1* | 10/2004 | Crawford et al. | | 134/22.12 |
| 2007/0181305 A1* | 8/2007 | McGavern et al. | | 166/298 |

* cited by examiner

APPARATUS DEVICE FOR REMOVING SCALE IN A BOREHOLE INSTALLATION

CROSS REFERENCES TO RELATED APPLICATIONS

This is the US National Phase application of PCT Application No. NO2009/000077 filed 6 Mar. 2009 which claims priority to Norwegian Patent Application No. 20081279 filed 11 Mar. 2008, both of which are incorporated herein by reference. The PCT Application was published in English on 17 Sep. 2009 under No. WO 2009/113863A1.

STATEMENT REGARDING FEDERALLY SPONSORED RESEARCH

Not Applicable

THE NAMES OF THE PARTIES TO A JOINT SPONSORED RESEARCH

Not Applicable

REFERENCE TO A SEQUENCE LISTING

Not Applicable

BACKGROUND OF THE INVENTION

1) Field of the Invention

The invention relates to an apparatus device for loosening scale in a borehole installation, more particularly an actuator provided with one or more cams arranged, by axial movement in the longitudinal direction of the apparatus, to move one or more cutting elements from a retracted passive state into a working position, the cutting element(s) projecting from an apparatus housing as the cutting element(s) is/are pressed against a surrounding tubular body from which scale is to be removed. The actuator is actuated mechanically by the tensioning of a line on which the apparatus is hanging or hydrostatically, for example, through coiled tubing to which the apparatus is connected.

In the recovery of hydrocarbon fluids from the underground, it is a known problem that substances carried in the fluid flow from the hydrocarbon-containing underground structure are deposited in the tubing by precipitation and deposition. The source of this problem may be substances existing in the structure, for example, substances dissolved in water accompanying the hydrocarbons, or it is substances which have been carried into the structure during production, for example salts in injection water pumped into the structure to increase the reservoir pressure. Common to the substances, which are the source of scale in the tubing, is usually that they are precipitated and deposited because of altered physical or chemical conditions as the fluid enters the tubing. Such a deposit may have ceramic properties, that is to say, it is hard and brittle—in the field also called "scale"—often in the form of calcium carbonate or calcium sulphate, or it may be in the form of paraffin wax which has a softer and tougher consistency. Common to such deposited products is that, over time, they reduce the flow from the hydrocarbon reservoir through the tubing to the surface.

2) Description of Related Art

Attempts have been made to solve the problem in different ways. One method includes the use of chemicals which are pumped down into the well to dissolve the scale so that it can be carried in the fluid flow out of the well.

Another method is mechanical cutting of the scale by means of a cutting tool which is passed through the tubing down to the production zone in question, where it is activated to work the scale inside the tubing. The pieces of scale material detached are carried in the fluid flow out of the well.

From U.S. Pat. No. 4,452,307 is known a reamer for removing paraffin, mineral scale, ice and other deposits from the inside of tubing or similar. A tapered housing provided with external cutting blades is set into limited rotation by gliding movement of the housing along a steep threaded connection between a central shaft and the housing. The rotational movement is achieved by repeated blows against the projecting end of the central shaft. The cutting blades thereby cut the deposits loose.

From U.S. Pat. No. 3,176,772 is known an arrangement of steel brushes which work a surrounding surface. U.S. Pat. Nos. 2,667,930 and 2,836,251 disclose spring-loaded scraping elements which work a surrounding surface by the rotating movement of an apparatus.

EP 516989 B1 discloses a pipe-cleaning device in which a cylindrical housing is provided with rotatable cutting elements disposed in recesses in the housing, the device being activated by a fluid flow through the pipe which is to be cleaned.

Further examples of the prior art in the field are FR 2543855 A1 and also U.S. Pat. Nos. 2,641,010, 4,920,600, 2,664,930 and 5,474,097.

BRIEF SUMMARY OF THE INVENTION

The invention has for its object to remedy or reduce at least one of the drawbacks of the prior art.

In a first aspect, the invention relates to an apparatus device for mechanically loosening scale internally in a pipe arranged to convey hydrocarbon fluids from a production zone in a well, characterized by an actuator, arranged in a housing, including an axially movable stem which extends through at least part of the housing and is provided with at least one cam, at least one cutting means being arranged radially movable in a recess in the housing. The cam bearing, by the axial movement of the actuator towards a first extreme position, against the cutting means, applying a radial outward push force to it. The cam relieving, by the axial movement of the actuator towards a second extreme position, the cutting means and having the effect of the cutting means being radially movable into the recess in the housing.

The cutting means may be a rotatable cutting disc.

The cutting means may be rotatably supported in a first end portion of an arm which is pivotal supported, at its other end portion, in the housing.

The apparatus may include several cutting means spaced on the periphery of the housing.

The cutting means may be divided into several groups, the groups being staggered in the axial direction of the apparatus.

Each group may comprise two, three or more cutting means.

The rotational axis of the cutting means may lie in a plane perpendicular to the longitudinal axis of the apparatus.

The rotational axis of the cutting means may lie in a plane deviating from the perpendicular to the longitudinal axis of the apparatus.

The actuator may include a spring which is arranged to move the actuator towards its first extreme position. Alternatively, the actuator may include a spring which is arranged to move the actuator towards the second extreme position.

In one embodiment, the actuator may be connected to a wire line.

In this embodiment the actuator may project through a first end portion of the housing and be provided with a fishing neck.

In another embodiment the first end portion of the housing may be connected in a fluid-sealing manner to coiled tubing.

In this embodiment the actuator may be provided with a through centre bore connected in a fluid-communicating manner to the coiled tubing.

In this embodiment, the actuator may further include a differential piston surface which is arranged to be subjected to a fluid pressure from a fluid contained in the coiled tubing. The actuator may be arranged to be movable towards the first extreme position by the application of a prescribed fluid pressure to the differential piston surface.

The differential piston surface may be formed of first and second stem end faces, the first stem end face being larger than the second stem end face.

In a second end portion, the housing may be provided with at least one nozzle which is in fluid communication with the coiled tubing and is arranged to carry fluid into the pipe.

The actuator may include an adjustable end stop which is arranged to reduce, when hitting a portion of the housing, the axial movement of the stem towards the first extreme position to reduce, thereby, the radial movement of the cutting means out of the recess of the housing.

In a second aspect, the invention relates to a method of mechanically loosening scale internally in a pipe arranged to convey hydrocarbon fluids from a production zone, characterized by the method comprising the following steps inserting an apparatus according to the invention to the immediate vicinity of a portion of the pipe which is to be cleaned of scale, —moving at least one cutting means radially out from a housing by moving an actuator axially towards a first extreme position in order, thereby, to push the at least one cutting means towards the scale, moving the apparatus further in the axial direction in the pipe, the at least one cutting means penetrating the scale, and carrying the loosened scale out of the pipe by means of a fluid flow.

In one embodiment, the method may further include the steps of inserting the apparatus into the pipe by means of a wire line, and moving the actuator axially towards the first extreme position by applying a spring pressure to the actuator, which exceeds the pull force of the wire line.

In this embodiment, the method may include the further step of sliding the apparatus in the direction of the pipe portion which is to be cleaned of scale by applying a push force to the wire line from a wire-line-feeding apparatus.

In an alternative embodiment, the method may include the further steps of inserting the apparatus into the pipe by means of coiled tubing, and moving the actuator axially towards the first extreme position by applying, to a differential piston surface on the actuator, a fluid pressure which overcomes the push force from a spring against the actuator.

In this embodiment the method may include the further step of carrying fluid from the coiled tubing through one or more nozzles of the apparatus into the pipe.

BRIEF DESCRIPTION OF THE DRAWINGS

In what follows are described examples of two alternative preferred embodiments which are visualized in the accompanying drawings, in which.

DETAILED DESCRIPTION OF THE INVENTION

Figure 1:
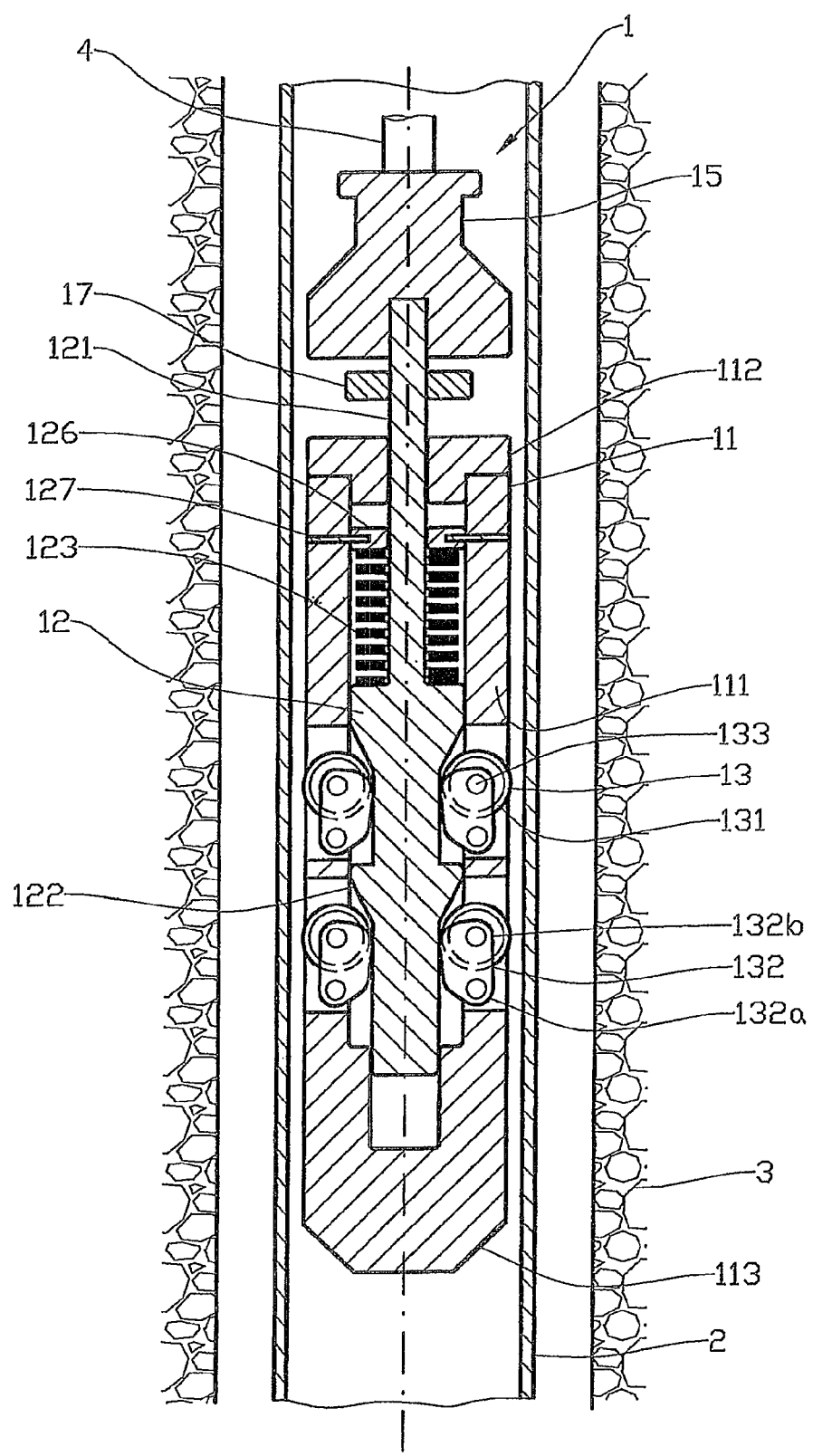
FIG. 1 shows a longitudinal section through a wire-line-operated apparatus according to an embodiment of the invention, the cutting means being retracted into the housing.
Figure 2:
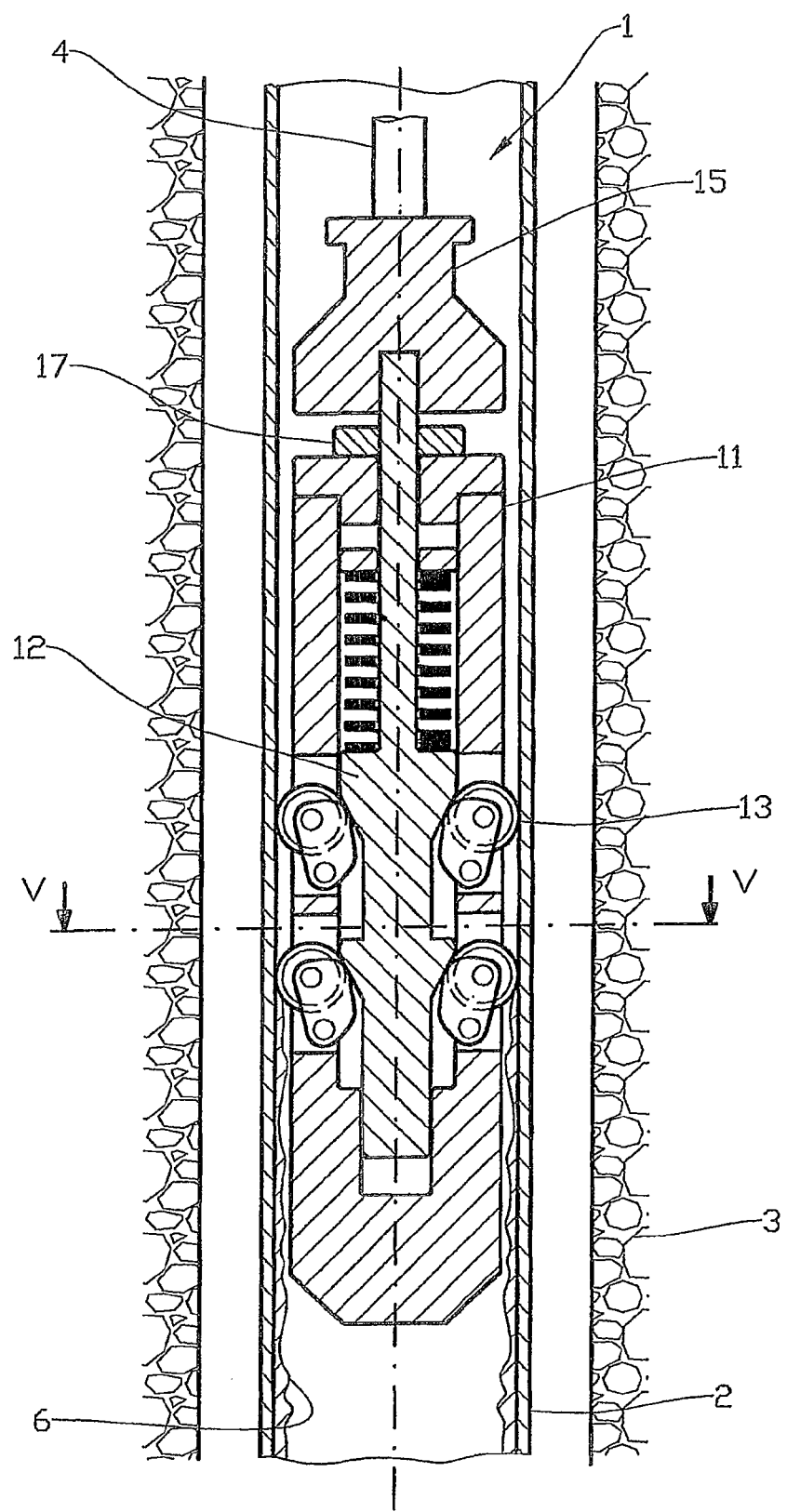
FIG. 2 shows a view corresponding to FIG. 1, but the cutting means have been pushed out into an operative position.
Figure 3:
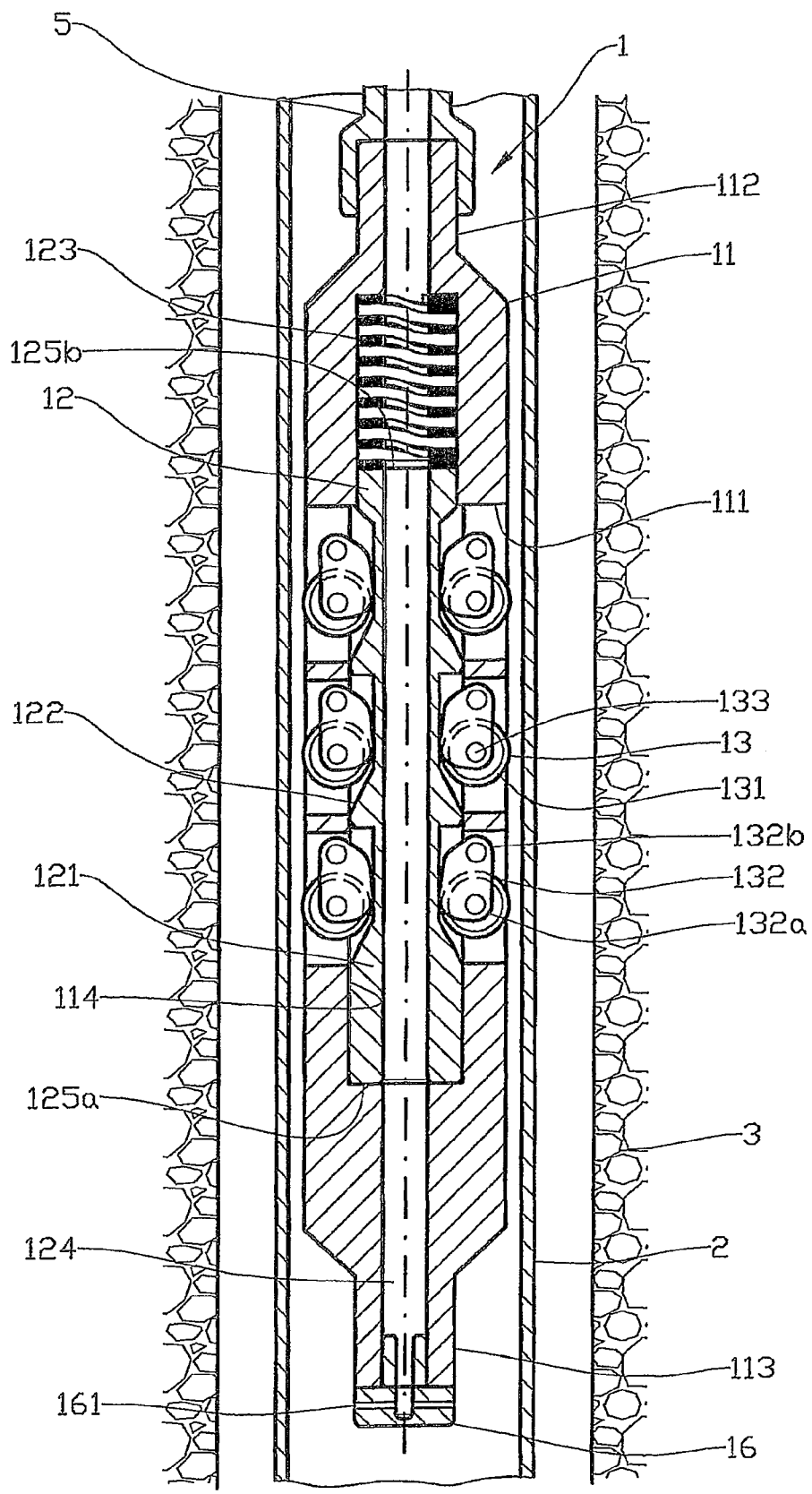
FIG. 3 shows a longitudinal section through an apparatus according to an alternative embodiment of the invention, operated by coiled tubing, the cutting means having been retracted into the housing.
Figure 4:
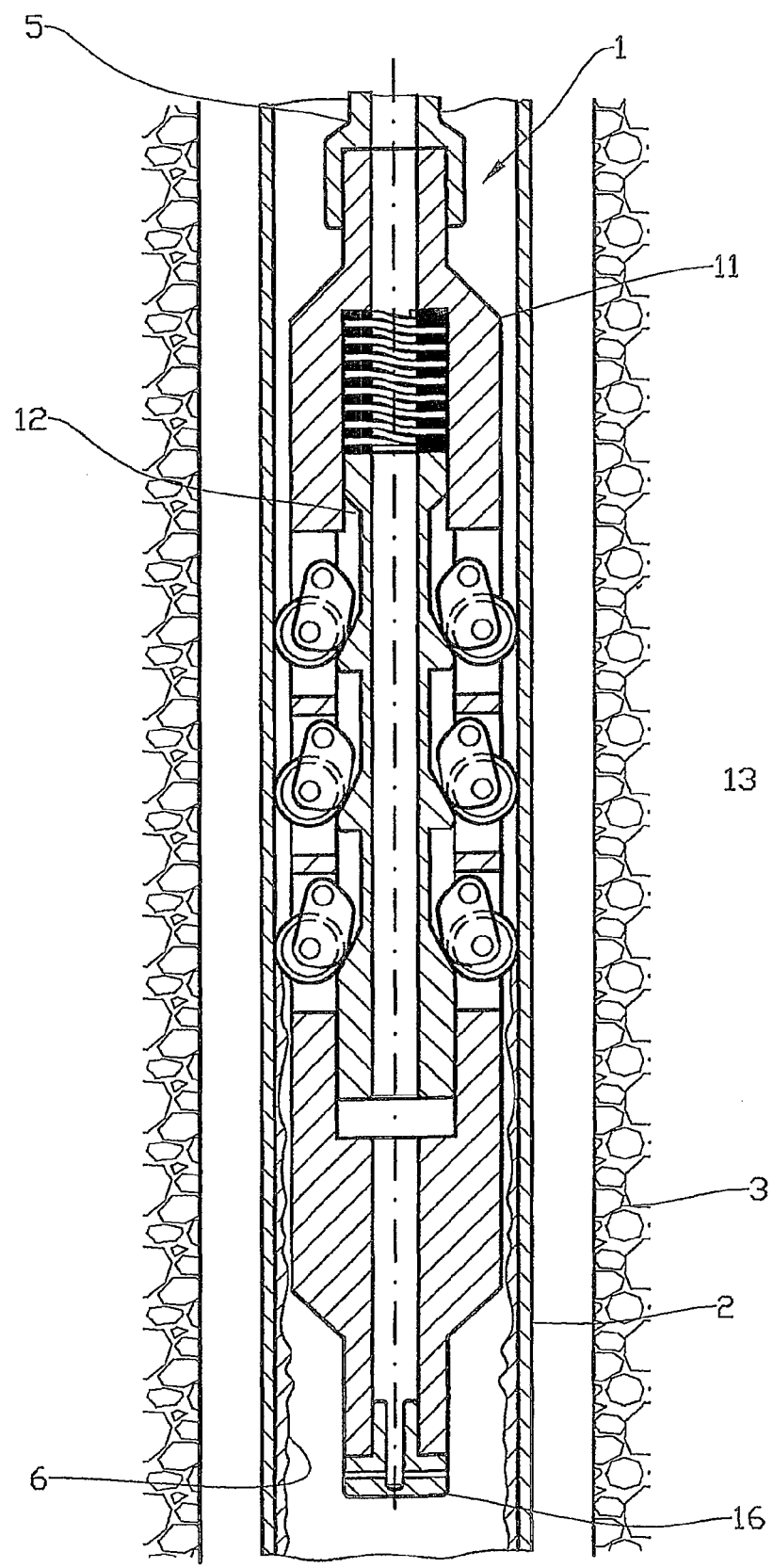
FIG. 4 shows a view corresponding to FIG. 3, but the cutting means have been pushed out into an operative position.

In the Figures the reference numeral 1 indicates an apparatus according to the invention arranged in a pipe 2, for example tubing, extending through a production zone 3 in an underground structure. In FIGS. 1 and 2 is shown an exemplary embodiment of the apparatus connected to and operated by means of a wire line 4 of a design known per se. In FIGS. 3 and 4 is shown an exemplary embodiment of the apparatus connected to and operated by means of coiled tubing 5 of a design known per se.

Scale 6 is schematically indicated on the inside of the pipe 2 in FIGS. 2 and 4.

Figure 5:
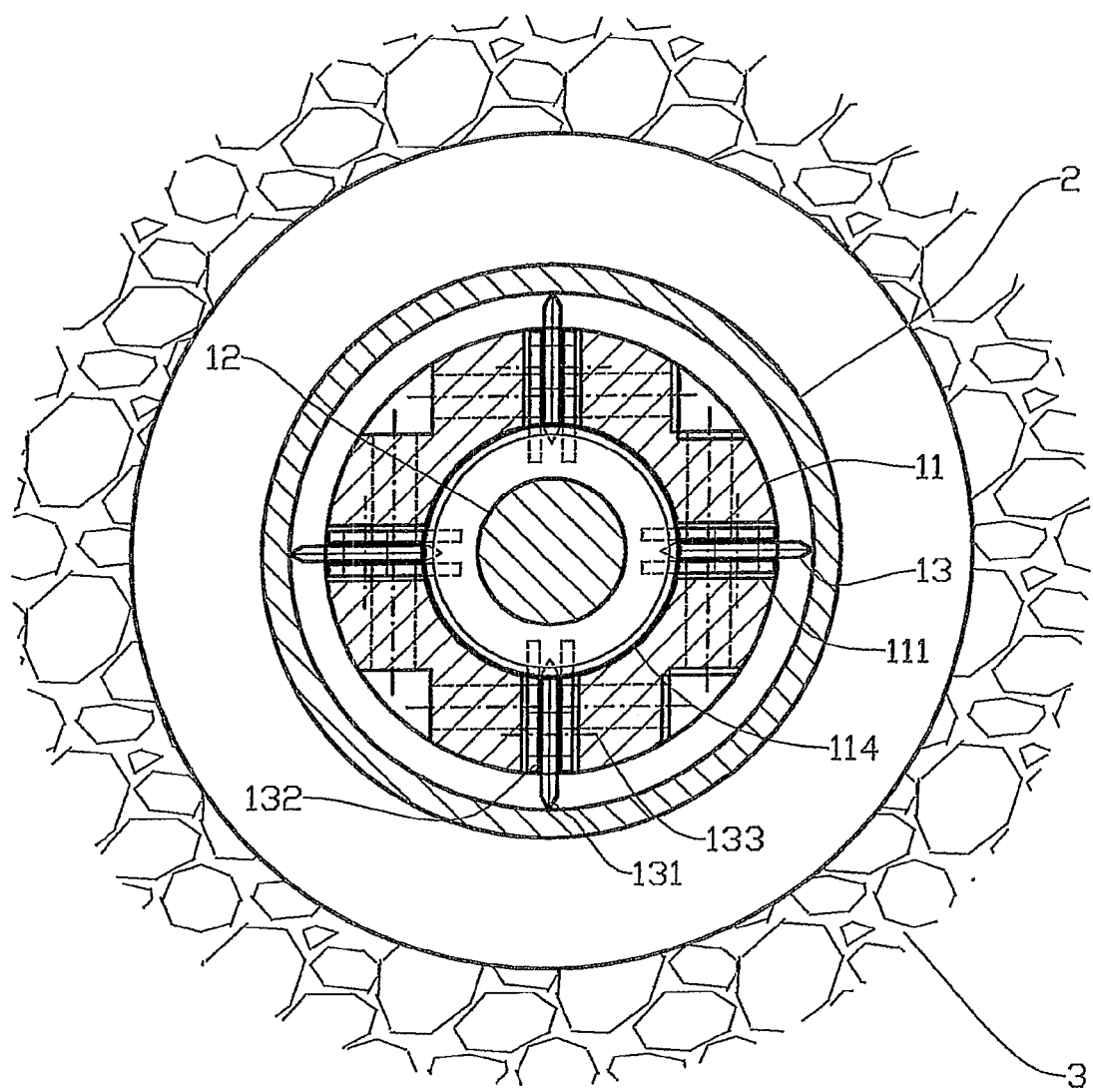
FIG. 5 shows, on a larger scale, a cross section V-V indicated in FIG. 2.

The apparatus 1 is constituted by a cylinder-shaped housing 11 provided with a centric bore 114 (see FIG. 5) accommodating an actuator 12. In recesses 111 extending radially out from the centric bore 114 to the outer surface of the housing 11 are several pivotally arranged cutting means 13.

In FIGS. 1 and 2 a fishing neck 15 (known per se) is shown forming the attachment of the wire line 4 to a stem 121 of the actuator 12, the actuator stem 121 projecting, in the wire-line embodiment, through a first end portion 112 of the housing 11. The fishing neck 15 is formed with an attachment portion for a fishing device (not shown) of a type known per se, for use in the retrieving of the apparatus 1 in the case of a wire-line rupture.

In the embodiment according to FIGS. 1 and 2, an adjustable end stop 17 is shown arranged on the actuator 12 and arranged to abut against the housing 11.

In the coiled-tubing embodiment, according to FIGS. 3 and 4, the stem 121 is provided with a center bore 124 which is connected in a fluid-communicating manner to the coiled tubing 5 via an extension of the centric bore 114 through the first end portion 112 of the housing 11, and to a plug 16 including several nozzles 161 in the second end portion 113 of the housing 11.

The stem 121 of the actuator 12 is provided with several tapered cams 122 arranged concentrically and spaced over a portion of the stem 121. During the axial movement of the stem 121 in the housing 11, the surface of the tapered cam 122 is arranged to bear against a portion of the cutting means 13 projecting partially into the centre bore 114 of the housing 11.

The cutting means 13 includes a rotatable cutting disc 131 supported in the first end portion 132a of an arm 132. A second end portion 132b of the arm 132 is pivotally supported in the housing 11. The second end portion 132b of the arm 132 is formed to abut the cam 122, the abutment surface being smoothly rounded to be able to glide along the sloping surface of the cam 122 as the actuator 12 is moved. The cutting disc 131 is provided with a cutting edge.

In the wire-line embodiment according to FIGS. 1 and 2, the actuator 12 is provided with a spring 123 arranged to apply a load to the stem 121 so that the actuator 12 is moved towards the cutting means 13. As the apparatus 1 is lowered into the pipe 2, the weight of the apparatus 1 will lead to compression of the spring 123 so that the actuator 12 is pulled up towards its one extreme position, in which the cutting means 13 are not loaded and may therefore be retracted into the recesses 111. A spring abutment 126 is secured to the housing 11 by means of several shear pins 127 (shown only in FIG. 1). The spring abutment 126 is arranged with a clearance to the end face of the centric bore 114. In a situation in which the spring 123 is not sufficiently compressible for the actuator 12 to give the cutting means 13 free movement into the housing 11, increased tension on the wire line 4 will cause the shear pins 127 to shear with the result that the actuator 12 together with the spring 123 and the spring abutment 126 may be moved until the spring abutment 126 hits the end face of the centric bore 114.

When the apparatus 1 according to the embodiment of FIGS. 1 and 2 has been moved up to an area with scale 6, the clearance between the apparatus 1 and pipe 2 decreases, and the apparatus 1 must be pushed forwards by the wire-line-feeding apparatus (not shown) being operated into forcedly running the wire line 4 down the pipe by applying a push force to the wire line 4. Thereby, the actuator 12 is moved into abutment against the cutting devices 13 which are thereby pivoted out of the recesses 111 of the housing 11 until hitting the internal wall surface of the pipe 2 or the scale 6.

In the coiled-tubing embodiment according to FIGS. 3 and 4, the actuator 12 is provided with a spring 123 arranged to apply a load to the stem 121 so that the cams 122 of the actuator 12 are moved away from their adjacent cutting means 13. In this embodiment, the stem 121 is provided with first and second stem end faces 125a, 125b, together forming a differential piston surface having a surface area $A_A = A_1 - A_2$, $A_1$ being the area of the first stem end face 125a, and $A_2$ being the area of the second stem end face 125b. A fluid pressure in the coiled tubing 5 will thereby apply a load to the actuator 12 counteracting the load applied by the spring 123, so that the cutting means 13 are pivoted out of the recesses 111 of the housing 11 until hitting the internal wall surface of the pipe 2 or the scale 6.

As long as a certain fluid pressure is not applied to the actuator 12, the actuator 12 will be moved towards its one extreme position, in which the cutting means 13 are not loaded and may thereby be withdrawn into the recesses 111.

In the exemplary embodiments are shown four cutting means 13 arranged in a group evenly spaced around the apparatus 1. It is obvious that each group may comprise a different number of cutting means 13. The apparatus 1 may include more or fewer groups of cutting means 13 than what is shown here in the exemplary embodiments, in which FIGS. 1 and 2 show two groups, whereas FIGS. 3 and 4 show three groups.

In the coiled-tubing embodiment, it is obvious to a person skilled in the art that fluid-sealing means (not shown) known per se will have to be used to prevent fluid leakage from the center bore 124 to the outside of the apparatus 1 through joining surfaces and interfaces between the stem 121 of the actuator 12 and the centric bore 114.

In the coiled-tubing embodiment, it is appropriate to supply washing and conveying fluid through the nozzles 161 by fluid jets which are directed against the internal wall surface of the pipe 2 and the scale 6.

Here, the cutting discs 131 are shown to lie in a plane coinciding with the center axis of the apparatus 1. It is within the scope of the invention to arrange the cutting discs 131 in a plane deviating from this.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

The invention claimed is:

1. An apparatus device for mechanically loosening scale inside a pipe arranged to convey hydrocarbon fluids from a production zone in a well, said device comprising:
    an actuator arranged in a housing including an axially movable stem which extends through an end portion of the housing and into connection with a wireline, said actuator being provided with at least one cam; and
    wherein the wireline is configured to apply a push force generated by a wireline-feeding apparatus to the actuator;
    at least one cutting element being arranged radially movable in a recess in the housing, the cam bearing, by the axial movement of the actuator towards a first extreme position, against the cutting element, applying to it the push force directed radially outwards; and the cam relieving, by the axial movement of the actuator towards a second extreme position, away from the cutting element, having the effect of the cutting element being able to move radially into the recess in the housing;
    wherein the actuator includes a spring arranged on the stem to apply a load to the stem and move the actuator towards the first extreme position;
    wherein the actuator includes an adjustable end stop which is arranged, by abutment against the end portion of the housing, to reduce the axial movement of the stem towards the first extreme position in order, thereby, to restrict the radial movement of the cutting element out of the recess of the housing.

2. The device in accordance with claim 1, wherein the cutting element is a rotatable cutting disc.

3. The device in accordance with claim 2, wherein the cutting element is rotatably supported in a first end portion of an arm which is pivotally supported, at a second end portion, in the housing.

4. The device in accordance with claim 1, wherein the apparatus includes several cutting elements spaced on a periphery of the housing.

5. The device in accordance with claim 4, wherein the cutting elements are divided into several groups, the groups being staggered in an axial direction of the apparatus.

6. The device in accordance with claim 5, wherein each group comprises two or more cutting devices.

7. The device in accordance with claim 2, wherein a rotational axis of the cutting element lies in a plane perpendicular to a longitudinal axis of the apparatus.

8. The device in accordance with claim 2, where a rotational axis of the cutting element lies in a plane deviating from the perpendicular to a longitudinal axis of the apparatus.

9. The device in accordance with claim 1, wherein the actuator is provided with a fishing neck.

* * * * *